United States Patent
Gulliver et al.

(10) Patent No.: US 8,715,507 B2
(45) Date of Patent: May 6, 2014

(54) STORM DRAIN BAFFLE TO DECREASE SEDIMENT WASHOUT

(75) Inventors: John Gulliver, New Brighton, MN (US); Adam Howard, St. Louis Park, MN (US); Omid Mohseni, St. Anthony, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 286 days.

(21) Appl. No.: 13/155,255

(22) Filed: Jun. 7, 2011

(65) Prior Publication Data

US 2012/0031851 A1    Feb. 9, 2012

Related U.S. Application Data

(60) Provisional application No. 61/352,250, filed on Jun. 7, 2010.

(51) Int. Cl.
| | |
|---|---|
| *E03F 5/14* | (2006.01) |
| *B01D 21/28* | (2006.01) |
| *B01D 21/02* | (2006.01) |
| *B01D 21/00* | (2006.01) |
| *C02F 103/00* | (2006.01) |

(52) U.S. Cl.
CPC . *E03F 5/14* (2013.01); *B01D 21/02* (2013.01); *B01D 21/28* (2013.01); *B01D 2021/0078* (2013.01); *B01D 2221/12* (2013.01); *C02F 2103/001* (2013.01)
USPC .......... 210/747.2; 210/801; 210/170.03; 210/521; 210/532.1

(58) Field of Classification Search
USPC .......... 210/747.2, 747.3, 801, 162, 170.03, 210/521, 532.1, 538
See application file for complete search history.

(56) References Cited

U.S. PATENT DOCUMENTS

| | | | | |
|---|---|---|---|---|
| 4,132,652 | A | * | 1/1979 | Anderson et al. ............. 210/521 |
| 4,157,969 | A | * | 6/1979 | Thies ............................. 210/521 |
| 4,689,145 | A | * | 8/1987 | Mathews et al. .......... 210/170.03 |
| 5,405,539 | A | * | 4/1995 | Schneider ................... 210/747.3 |
| 6,524,473 | B2 | * | 2/2003 | Williamson ............. 210/170.03 |
| 6,955,756 | B2 | * | 10/2005 | Fallon ....................... 210/170.03 |
| 7,011,743 | B2 | | 3/2006 | Use et al. |
| 7,033,496 | B2 | * | 4/2006 | Thacker et al. ............... 210/521 |
| 7,282,143 | B2 | * | 10/2007 | Liao .............................. 210/521 |
| 7,534,355 | B2 | * | 5/2009 | Lockerman et al. ..... 210/170.03 |
| 7,544,303 | B2 | * | 6/2009 | Frink ............................ 210/801 |
| 2005/0279709 | A1 | * | 12/2005 | Peters et al. ................. 210/747 |
| 2011/0024340 | A1 | * | 2/2011 | Horner ..................... 210/170.03 |

* cited by examiner

*Primary Examiner* — Christopher Upton

(74) *Attorney, Agent, or Firm* — Schwegman Lundberg & Woessner, P.A.

(57) ABSTRACT

Some examples includes a flow-through stormwater sump having a bottom and defining an inlet opening, an outlet opening and a top access opening, an inlet conduit coupled to the flow-through stormwater sump at the inlet opening, an outlet conduit coupled to the flow-through stormwater sump at the outlet opening and a flow-path baffle disposed in the stormwater sump, the flow-path baffle being substantially planar and defining a plurality of openings, the flow-path baffle oriented such that a centerline of the inlet conduit intersects a major plane of the baffle at a point and a centerline of the outlet conduit intersects the major plane at a further point, the flow-path baffle disposed in the stormwater sump in a direct impingement inlet flow-path of the inlet conduit and a direct impingement outlet back-flow-path of the outlet conduit.

19 Claims, 5 Drawing Sheets

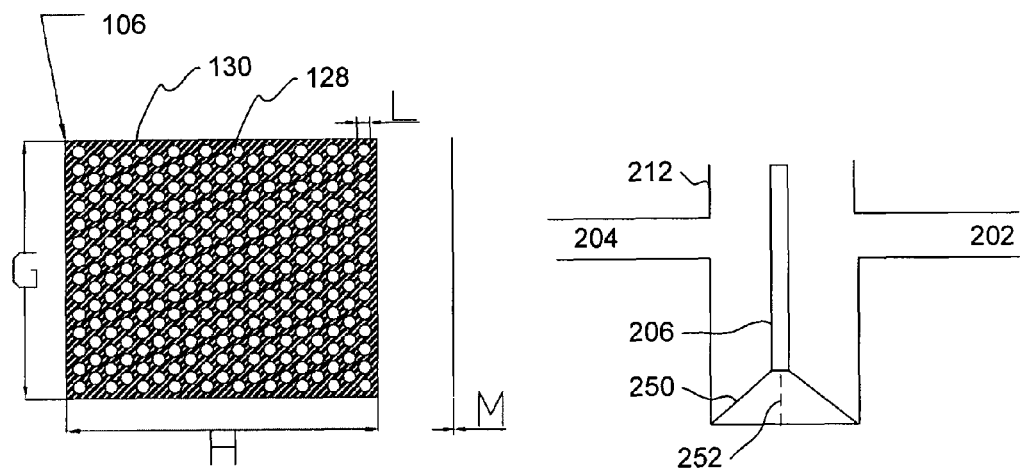
FIG. 1D
FIG. 2
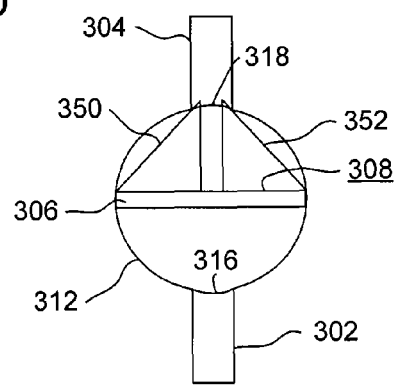
FIG. 3
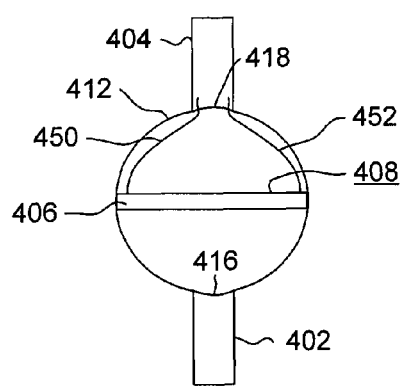
FIG. 4
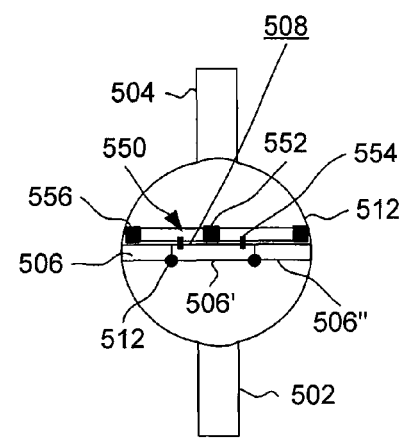
FIG. 5

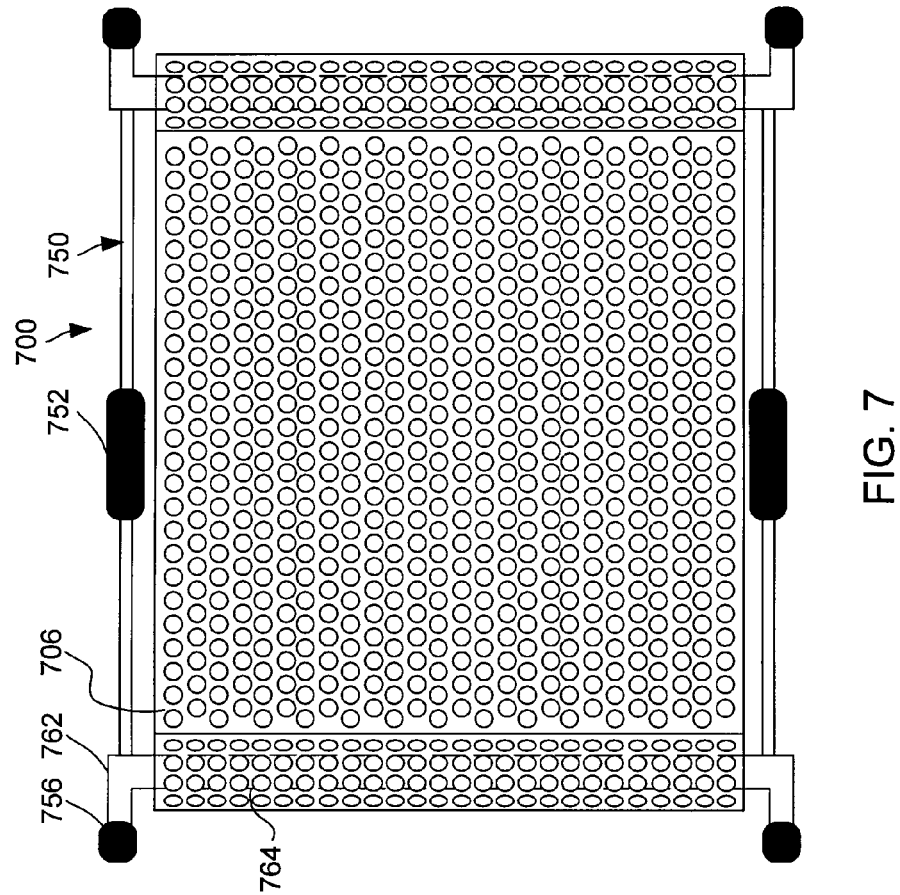
FIG. 7
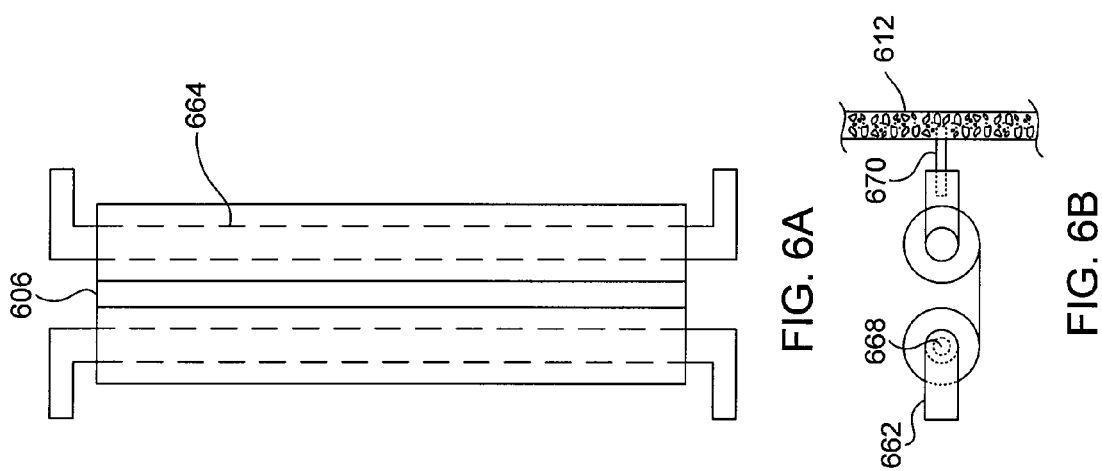
FIG. 6A
FIG. 6B

STORM DRAIN BAFFLE TO DECREASE SEDIMENT WASHOUT

CROSS REFERENCE TO RELATED APPLICATION(S)

This application is claims benefit of U.S. Provisional Patent Application No. 61/352,250, filed Jun. 7, 2010, the contents of which is hereby incorporated by reference.

BACKGROUND

Storm drain systems often include a stormwater sump or well. Some sumps are designed to allow access to the storm sewer. Some sumps serve as a junction for multiple storm drains. In some instances, the stormwater sump collects sediment for occasional removal by a refuse hauler instead of allowing the sediment to travel through the entire storm system and ultimately into a lake or river. Existing stormwater sumps often cannot retain sediments under high flow conditions and undesirably permit sediment to travel out of a sump. Systems, apparatus and methods are needed to improve sediment retention.

SUMMARY

This document describes, in various examples, a system for baffling at least one stormwater flow-path so it does not excessively disturb sediment at the bottom of the sump. Some examples include a flow-through stormwater sump. A sump includes at least one inlet and at least one outlet, and has a top access opening, in some examples. An access opening is for workers to enter through, or for inserting a suction hose to pump out sediment, in some examples. In some instances, an access opening includes openings to allow water from the ground surface to drain into the sump. According to various examples, the sump is coupled with at least one inlet conduit and at least one outlet conduit, and a flow-path baffle is positioned in the sump such that water flowing into the sump, such as through an inlet conduit during a storm, flows into the baffle. In some instances, this baffle is flat and has at least one opening for water to flow through. In various examples, the baffle distributes the high flow velocity of at least one inlet jet across the baffle. The baffle provides head loss to reduce the concentration of flow energy in an inlet flow, in various examples. The position, size and shape of the baffle, and the size and shape of the openings, are selected to reduce or eliminate scour and washout, i.e. sediment undesirably leaving the sump, according to several examples.

BRIEF DESCRIPTION OF THE DRAWINGS

FIG. 1D is a cross sectional side view taken along line B-B of FIG. 1A, according to some examples.
FIG. 2 is a cross sectional side view of a storm drain including a stand, according to some examples.
FIG. 3 is a plan view of a storm drain including arms to resist rotation of the baffle, according to some examples.
FIG. 4 is a plan view of a storm drain including a deformable arm to resist rotation of the baffle, according to some examples.
FIG. 5 is a plan view of a storm drain interference fit into a sump, according to some examples.
FIG. 6A is a front view of a furled flow-path baffle, according to some examples.
FIG. 6B is a front view of a furled flow-path baffle, according to some examples.
FIG. 7 is a front view of an unfurled flow-path baffle spanned out to interference fit into a sump, according to some examples.

DETAILED DESCRIPTION

Figure 1C:
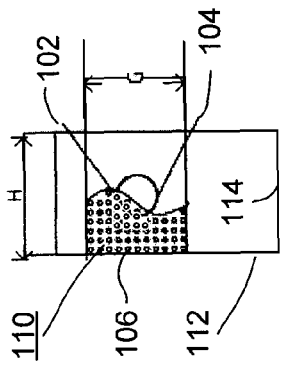
FIG. 1C is a side view of the storm drain of FIG. 1A showing a partial detail of the baffle, according to some examples.

This description includes examples of a flow-path baffle to interrupt fluid flow into a stormwater sump. Several examples describe a flow-path baffle that includes at least one opening and that is placeable or formed into a flow-through standard sump such as a manhole. The flow-path baffle examples described here improve sediment collection and reduce or eliminate sediment scour or washout.

Sediment transport into, out of or though a flow-through sump is, in part, dependent upon a fluid circulation pattern in the sump, during operation. For example, as water enters a sump during a rain event it plunges from at least one inlet of the sump into a bottom portion of the sump. The plunge is due to the deflection of fluid momentum as it impinges on the far wall, across from at least one inlet. According to several examples, plunging movement of the fluid can create an undesirable fluid circulation in the sump. The undesirable fluid circulation begins with a fluid entering the sump, for example through at least one inlet, and creating a downward fluid flow at a downstream end of the sump proximal a sump outlet. The fluid circulation additionally includes an upstream fluid flow at the bottom of the sump, i.e., in a direction from an outlet toward at least one inlet. Finally, the fluid circulation includes an upstream upward fluid flow from the bottom of the sump toward the sump inlet opening.

In several examples, if this circulation pattern is sufficiently strong, sediment at the bottom of the sump can be mobilized by the fluid flow and can then be moved upstream, lifted back into the inflow jet travelling through at least one inlet. In some examples, the sediment is removed from the sump, such as through an outlet of the sump. In various examples, sediment includes, but is not limited to, that which is disclosed in Unified Soil Classification System, ASTM D 2487, which is incorporated herein by reference in its entirety. In some examples, flow-path baffles described here provide an improvement over sumps with no baffles by collected materials that float, including, but not limited to, polymeric objects such as plastic bags.

The flow-path baffle examples described here reduce undesirable fluid circulation. Some examples spread the fluid flow from at least one inlet laterally, i.e. from a center of the sump towards exterior walls of the sump. At high discharge the inflow appears as at least one jet into the sump. An inflow jet, instead of entering the sump and plunging into water at a downstream end of the sump, flows into a flow-path baffle that disperses the flow and reduces the inertia of the jet. In some examples, the baffle disperses an inflow jet, dissipating energy and reducing or eliminating downward flow in the downstream portion of the sump. At least one jet of lower inertia reduces or eliminates downwelling that occurs at the far end of the sump, across from at least one inlet, and thus reduces or eliminates the upwelling and washout of sediment that has previously been deposited in the sump.

Placement of the flow-path baffle in the sump influences the effectiveness of the sump. Various examples position a bottom of the flow-path baffle above the sediment or in-use water level. Some examples that use a predetermined distance of less than 1 foot from the bottom of the flow-path baffle to the top of the sediment height will cause washout or scour below the flow-path baffle. In some instances, if the bottom of the flow-path baffle is closer to at least one inlet conduit invert than 1 foot, the entire jet may not be intercepted by the flow-path baffle. A parameter used in some examples to govern flow-path baffle design is the location of the bottom of the flow-path baffle and the available depth for sediment deposition. In some instances, the sump is periodically cleaned, such as when the sediment comes closer than 1 foot to the bottom of the flow-path baffle. In some examples, a deeper sump will require less maintenance than a shallow sump.

The orientation of the flow-path baffle with respect to the flow-path is also important. Some examples position the flow-path baffle perpendicular to the flow, such as being perpendicular to at least one flow-path vector. In some examples, the flow-path baffle is disposed vertically in the sump, i.e. the baffle is substantially planar and a major plane of the flow-path baffle is substantially vertical in the sump. In some examples, the flow-path baffle is centered in the sump, such as to ease entry into the sump and to ease installation of the flow-path baffle into the sump. In some examples, a centerline of the baffle intersects with a diameter of the sump. In some examples, a center line extending out of an inlet conduit intersects a center line of the flow-path baffle as well as a vertical center line of the sump. Additional examples include an inlet conduit that has a centerline that does not intersect with a vertical centerline of the sump.

In some examples, the flow-path baffle includes at least one opening. In various examples, the at least one opening is through the flow-path baffle, with each extending from one major surface of the flow-path baffle to a further major surface of the flow-path baffle opposite the major surface. The percentage of open area for the flow-path baffle is sized in association with a particular application. In some examples, if the percent open area is less than 40%, flow resistance will be too low, causing washout or scour below the flow-path baffle. In some examples, a proper percentage is determined using experimental models. In additional examples, if the percent open area is larger than 50% the resistance will not be large enough to dissipate a sufficient amount of energy to decrease downstream downward flow and to spread the flow. In various examples, the percentage of the flow-path baffle that is open is approximately 46%.

In various examples, the size of at least one opening is associated with the amount of trash that is captured. If the size of at least one opening is below 1 inch, debris will be collected, in some examples. These examples increase the flow resistance provided by the fluid flow-path baffle, which can diminish its effectiveness and requiring more frequent maintenance. A large size of at least one opening of 5 inches passes trash in several examples, and requires less frequent maintenance.

Figure 1A:
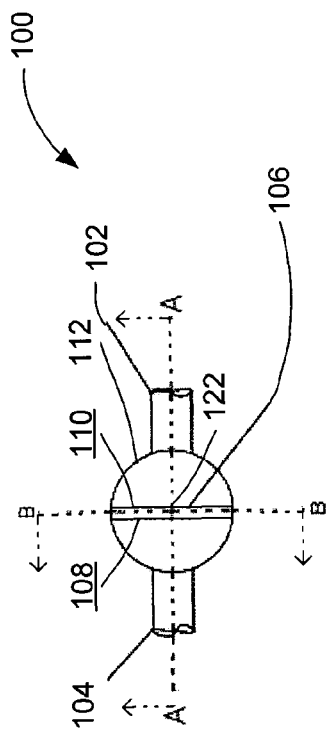
FIG. 1A is a plan or top view of a storm drain, according to some examples.
Figure 1B:
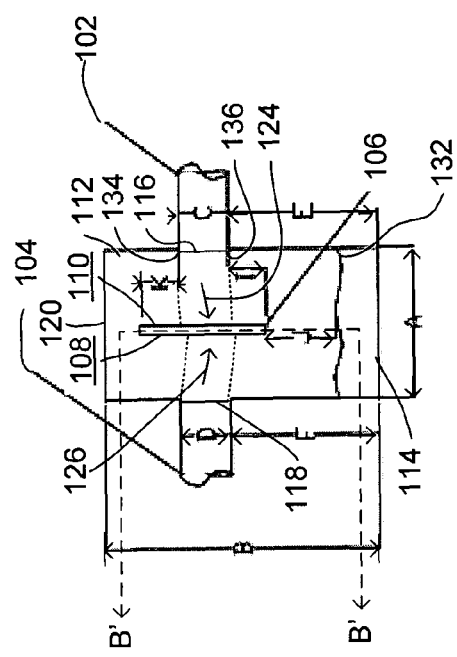
FIG. 1B is a cross sectional side view taken along line A-A of FIG. 1A, according to some examples.

FIG. 1A is a plan or top view of a storm drain, according to some examples. FIG. 1B is a cross sectional side view taken along line A-A of FIG. 1A, according to some examples. FIG. 1C is a side view of the storm drain of FIG. 1A showing a partial detail of the flow-path baffle, according to some examples. FIG. 1D is a cross sectional side view taken along line B-B of FIG. 1A, according to some examples.

Various examples include a system 100 that includes a flow-through stormwater sump 112. In various examples, the flow-through stormwater sump 112 has a bottom 114 and defines an inlet opening 116, an outlet opening 118 and a top access opening 120. Although the pictured sump 112 is substantially cylindrical, other sump shapes are possible, include sumps having a regular orthogonal shape, some other quadrilateral-faced prismatoid or a curvilinear shape.

In some examples, at least one inlet conduit 102 is coupled to the flow-through stormwater sump 112 at an inlet opening 116. In some instances, at least one outlet conduit 104 is coupled to the flow-through stormwater sump 112 at an outlet opening 118. In various examples, at least one inlet conduit is substantially tubular proximal the flow-through stormwater sump. In various examples, at least one outlet conduit is substantially tubular proximal the flow-through stormwater sump. In various examples, one or both of an inlet conduit 102 and an outlet conduit 104 are substantially horizontal proximal the flow-through stormwater sump In various examples, a flow-path baffle 106 is disposed in the stormwater sump 112. In various examples, the flow-path baffle 106 is substantially planar, and in additional examples, the flow-path baffle 106 is nonplanar. In various examples, the flow-path baffle 106 defines at least one opening. In some examples, the flow-path baffle 106 defines a plurality of openings. The flow-path baffle 106, in certain examples, is oriented such that a centerline, for example one parallel to A-A, of an inlet conduit 102 intersects a major plane B-B, B'-B' of the baffle at a point 122. In some examples, a centerline, for example one parallel to A-A, of an outlet conduit 104, intersects the major plane B-B at a further point. In some examples, the point and the further point are along a long parallel to A-A. In various examples, the flow-path baffle is 106 disposed in the stormwater sump 112 in a direct impingement inlet flow-path 124 of an inlet conduit 102. In various examples, the flow-path baffle is 106 disposed in the stormwater sump 112 in a direct impingement outlet back-flow-path of an outlet conduit 104.

In some examples the flow-path baffle 106 is sized to function with a particular sump. Table 1 includes example dimensions of a flow-path baffle 106.

TABLE 1

Dimensions of Examples

| Label | Description | Example Dimension |
|---|---|---|
| A | Sump Diameter | |
| B | Sump Height | |
| C | Inlet Diameter | |
| D | Outlet Diameter | |
| E | Inlet Invert Height from Sump Bottom | |
| F | Outlet Invert Height from Sump Bottom | |
| G | Flow-path Baffle Height | I + C + K |
| H | Flow-path Baffle Width | A, in some examples |
| I | Inlet Invert Height from Flow-path Baffle Bottom | 1 foot |
| J | Flow-path Baffle Bottom to Sediment Height | ≥1 foot |
| K | Flow-path Baffle Top to Inlet Crown | ≥0.5 foot |
| L | Flow-path Baffle Opening Diameter | 1 inch to 3 inches |
| M | Flow-path Baffle Plate Thickness | 0.125 inches |

In some examples, the vertical flow-path baffle is centered in the sump. In some examples, a major plane B-B, B'-B' that bisects the flow-path baffle between the major face 108 and the further major face 110 intersects with a centerline of one or both of at least one inlet and an outlet. In some examples, the intersection is orthogonal. Other examples angle the baffle 106 with respect to the one or both the B-B and B'-B' axis. In various examples, the flow-path baffle 106 is substantially vertical. In some of these examples, the flow-path baffle 106 is substantially perpendicular to one or both of an inlet flow-path 124 and an outlet flow-path 126 such as a backflow-path. In some examples, the flow-path 106 baffle is centered along a total flow-path length, which is sump diameter A in some examples.

The flow-path baffle 106 defines at least one opening 128 in various examples. In various examples, the percent open area is between around 40% open and 50% open. In some examples, the flow-path baffle 106 is approximately 46% open. In various examples, at least one opening 128 is of a shape of shapes including, but not limited to, circular, rectangular, regular, irregular and curvilinear. In some examples, multiple openings are similarly sized. In some examples, multiple circular openings each have a diameter of from about 1 inch to about 3 inches. Certain examples determine the diameter of at least one opening by constructing a test model and then selecting an opening size that reduces washout or scour to a predetermined level.

According to some examples, the diameter of the at least one opening 128 is determined by multiplying an inlet diameter "C" by a scale factor. Examples include at least one opening 128 that is ⅟₁₈*C, ⅙*C, ⅓*C and ½*C. In some examples, an inlet diameter "C" is 18 inches, and as such, ⅟₁₈*C corresponds to 1 inch, ⅙*C corresponds to 3 inches, ⅓*C corresponds to five inches and ½*C corresponds to nine inches.

In various examples, the flow-path baffle geometry is dimension M by dimension I+C+K by dimension A. According to several examples, the dimension M is between 1.404 millimeters (0.055 inches) and 4.211 millimeters (0.166 inches). According to several examples, the dimension M is between 1 millimeter and 4 millimeters. In various examples, the flow-path baffle 106 is around 0.125 inches thick. In some examples, the flow-path baffle 106 has a width that approximately spans the sump 112 diameter if circular. In some examples in which the sump 112 is shaped otherwise, the flow-path baffle 106 has a width sized to span the full width of sump as measured perpendicular to flow through one or both an inlet conduit and an outlet conduit. In some examples, the flow-path baffle 106 is formed of stainless steel. Some examples include steel that is 0.125 inches thick. In some examples, the flow-path baffle 106 is formed of a plastic. In some examples, the flow-path baffle 106 is welded to the sump. In some examples, the flow-path baffle 106 is bolted to the sump.

In various examples, the top 130 of the flow-path baffle 106 is positioned such that a sediment height 132 does not exceed the top of the flow-path baffle 106 during a predetermined fluid flow event. In some examples, a top of the flow-path baffle 106 is vertically below a crown 134 of an inlet opening 116.

In some examples, the system 100 results in a head loss increase of around 0.2 foot with flow-path baffle installed versus head loss of the system 100 without a flow-path baffle 106. In various examples, such a head loss correlates with a top of the flow-path baffle that is around 0.5 foot above the crown 134 of an inlet conduit.

In various examples, the bottom of flow-path baffle is around 1 foot below an inlet conduit invert 136. In some examples, the flow-path baffle 106 is less effective if a distance between the bottom of the flow-path baffle 106 and the top of the sediment is less than around 1 foot.

FIG. 2 is a cross sectional side view of a storm drain including a stand, according to some examples. The sump 212 has at least one inlet 202, and outlet 204 and a flow-path baffle 206 installed in the sump 212. In various examples, the sump constrains the flow-path baffle 106 laterally. For example, if the baffle is shaped like a sheet, the edges of the sheer are constrained in the baffle such that the sheet extends along a diameter of the sump 212. In various examples, a stand constrains the baffle vertically. In some examples, the stand includes a plurality of legs 252. In additional examples, the stand is a single leg stand 252. Optionally, the stand includes an adjustment turnbuckle.

FIG. 3 is a plan view of a storm drain including arms to resist rotation of the baffle, according to some examples. The sump 312 has an inlet 302, and outlet 304 and a flow-path baffle 306 installed in the sump 312. In various examples, at least one arm 350 is coupled to a major face 308 of the flow-path baffle 306, such as via hinge. In some examples, the at least one arm 350 is to rotate into the one of an inlet opening 316 and outlet opening 318. Some examples include an arm 350 and a further arm 352 opposite the arm that is coupled to the flow-path baffle 306 and extends into one of an inlet opening and outlet opening and constrains the rotational orientation of the major plane 308 with respect to the opening. In various examples, the at least one arm 350 is coupled to the flow-path baffle 206 extend into one of an inlet opening and an outlet opening and constrain the rotational orientation of the major plane 308 with respect to the opening.

FIG. 4 is a plan view of a storm drain including a deformable arm to resist rotation of the baffle, according to some examples. The sump 412 has an inlet 402, and outlet 404 and a flow-path baffle 406 installed in the sump 412. In various examples, at least one arm extends into one or both of an inlet opening 416 and an outlet opening 418. In some examples, the arm 450 is a deformable spring. In various examples, a further arm 452 opposite the arm 450 is coupled to the flow-path baffle 406 and extends into the other of the inlet opening and outlet opening and constrains the rotational orientation of the major plane 408 with respect to the inlet 416 and outlet 418 openings.

FIG. 5 is a plan view of a storm drain interference fit into a sump, according to some examples. The sump 512 has an inlet 502, and outlet 504 and a flow-path baffle 506 installed in the sump 512. In some examples, the flow-path baffle 506 is constrained to the sump 512 via a rod 550. In some examples, the rod 550 is coupled to the flow-path baffle 506 such as by fasteners 554. In some examples, the rod 550 is adjusted to interference fit into the sump 512. In some examples, the rod 550 includes a turnbuckle 552 adjusted to the interference fit. In some examples, the flow-path baffle comprises a plurality of plates joined to one another with at least one hinge 558. In various examples, the hinges allow the baffle to be folded up when inserted through a manhole, and then unfolded in use.

FIG. 6A is a front view of a furled flow-path baffle, according to some examples. In various examples, at least one center spool 664 is used to for furling a baffle 606. In various examples, a furled flow-path baffle 606 is compact and sized to fit through a sump entry such as a manhole entry. FIG. 6B is a front view of a furled flow-path baffle, according to some examples. In some examples, a mounting leg 662 is positioned for fastening to a sump 612. In some examples, a fastener such as a bolt 670 is used to fasten the mounting leg to the sump 612. The present subject matter is not limited to examples in which the mounting leg 662 is mounted to a sump before unfurling of a flow-path baffle. The mounting leg 662 is an example of a mounting leg, and other devices are compatible with mounting the flow-path baffle 606 in a sump 612. In some examples, a detent mechanism 668 applies a spring bias to maintain the flow-path baffle in a furled configuration. In some examples, the detent mechanism includes at least one detent to hold the flow-path baffle in an unfurled position once a spring bias of the detent mechanism 668 is overcome, such as by an operator during installation.

FIG. 7 is a front view of an unfurled flow-path baffle spanned out to interference fit into a sump, according to some examples. The flow-path baffle 706 includes at least one opening. In some examples, flow-path baffle 706 is shown partially furled around at least one spool 764. In some examples, the flow-path baffle is not furled at all in use. In various examples, at least one rod assembly 750 is interference fit a flow-path baffle assembly 700 into a sump. In some examples, at least one foot 756 forms part of the at least one rod assembly 750. In some examples, at least one foot 756 is pliant. In additional examples, the feet 756 are not pliant. Some examples include spikes, and other foot types are possible.

Some examples include an adjuster 752 to adjust a width of the rod assembly 750 as illustrated. In examples, the rod assemblies are orthogonal to the spools 764, but in additional examples, they are parallel. In some examples, the rod assembly is integrated with a spool eliminating vertical or heightwise supports for the flow-path baffle 706.

Figure 8:
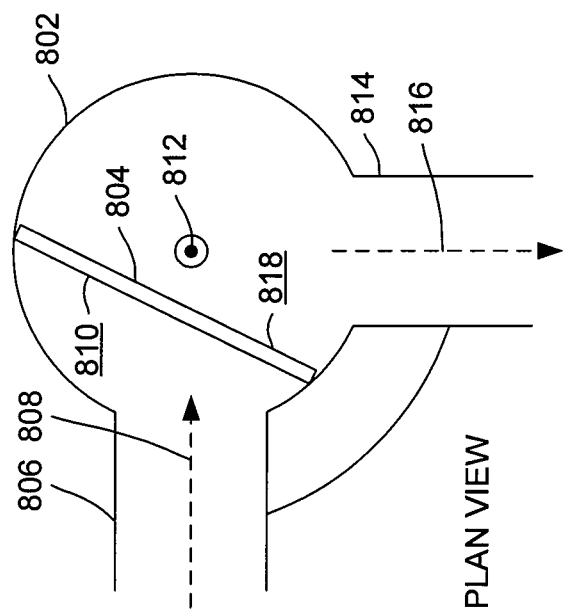
FIG. 8 is a plan view of a baffle angled with respect to an inlet flow-path vector, according to some examples.

FIG. 8 is a plan view of a baffle angled with respect to an inlet flow-path vector, according to some examples. A sump 802 is shown from the top. A covering such as a manhole is omitted from the figure in order to show the internal configuration. A flow-path baffle 804 is positioned in the sump 802. According to some examples, at least a portion of an inlet flow-path 806 travels along an inlet flow-path vector 808. In some examples, an inlet flow-path vector 808 is aligned with the baffle 804 such that an inlet flow-path is into a planar surface 810 the baffle 804. In some examples, an inlet flow-path vector 808 is other than parallel to the planar surface 810 of the baffle 804. In various examples, a planar surface 810 of the baffle 804 is parallel to a height 812 of the sump 802. The height 812 of the sump is shown as an arrow coming out of the figure, toward the viewer.

According to some examples, at least a portion of an outlet flow-path 814 travels along a flow-path vector 816. In some examples, an outlet flow-path vector 816 is aligned with the baffle 804 such that an outlet flow-path is into a planar surface 818 the baffle 804. In some examples, an outlet flow-path vector 816 is other than parallel to the planar surface 818 of the baffle 804. In various examples, a planar surface 818 of the baffle 804 is parallel to a height 812 of the sump 802.

Figure 9:
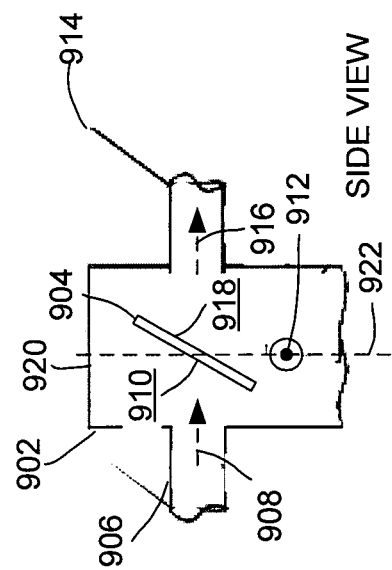
FIG. 9 is a side view of a baffle angled with respect to an inlet flow-path vector, according to some examples.

FIG. 9 is a side view of a baffle angled with respect to an inlet flow-path vector, according to some examples. A sump 902 is shown from the side. A covering such as a manhole 920 is shown. A flow-path baffle 904 is positioned in the sump 902. According to some examples, at least a portion of an inlet flow-path 906 travels along an inlet flow-path vector 908. In some examples, an inlet flow-path vector 908 is aligned with the baffle 904 such that an inlet flow-path is into a planar surface 910 the baffle 904. In some examples, an inlet flow-path vector 908 is other than parallel to the planar surface 910 of the baffle 904. In various examples, a planar surface 910 of the baffle 904 is parallel to a width 912 of the sump 902. The width 912 is orthogonal to a height 922 of the sump 902. The width 912 of the sump is shown as an arrow coming out of the figure, toward the viewer.

According to some examples, at least a portion of an outlet flow-path 914 travels along a flow-path vector 916. In some examples, an outlet flow-path vector 916 is aligned with the baffle 904 such that an outlet flow-path is into a planar surface 918 the baffle 904. In some examples, an outlet flow-path vector 916 is other than parallel to the planar surface 918 of the baffle 904. In various examples, a planar surface 918 of the baffle 904 is parallel to a width 912 of the sump 902. In some examples, an inlet flow-path vector 908 is parallel to an outlet flow-path vector 916. In some examples, they are collinear.

Figure 10:
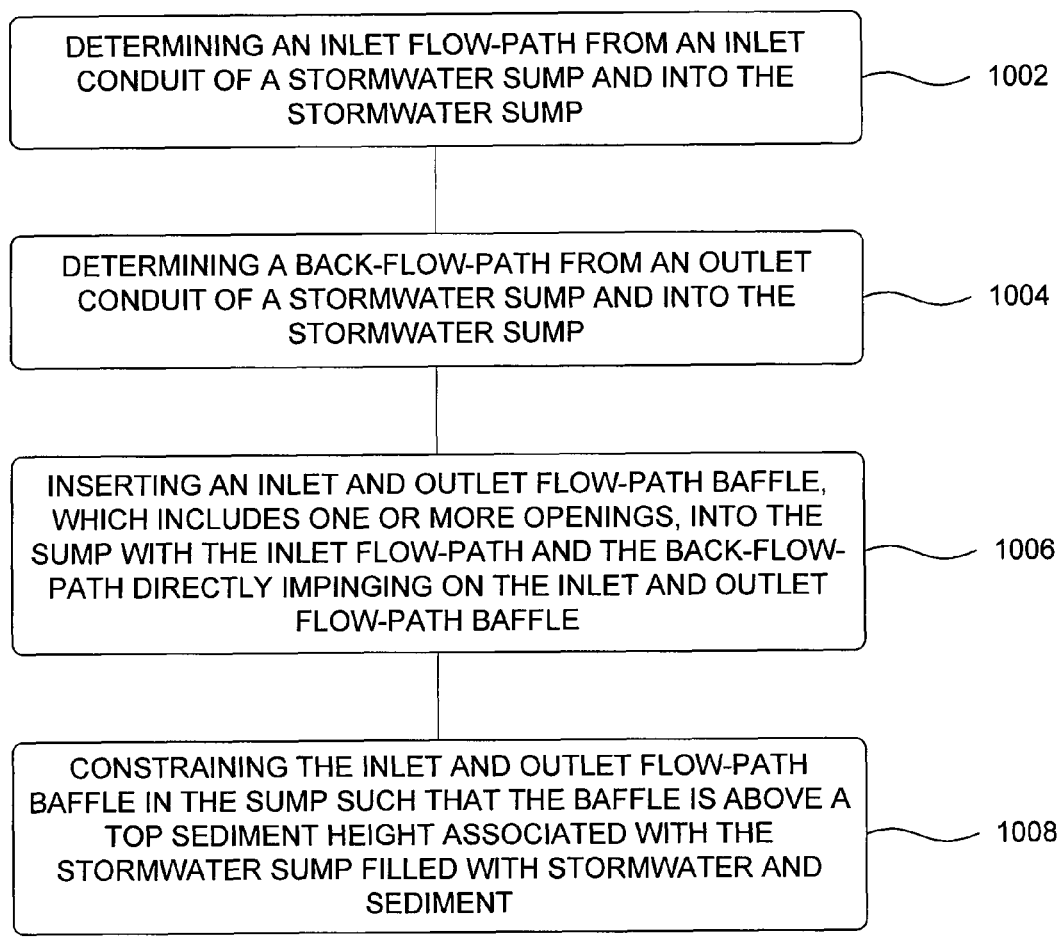
FIG. 10 shows a method of baffling flow, according to some examples.

FIG. 10 shows a method of baffling flow, according to some examples. Various examples include a method of installing a flow-path baffle. At 1002, the method includes determining an inlet flow-path from an inlet conduit of a stormwater sump and into the stormwater sump. At 1004, the method includes determining a back-flow-path from an outlet conduit of a stormwater sump and into the stormwater sump. At 1006, the method includes inserting a flow-path baffle, which includes at least one opening, into the sump with an inlet flow-path and the back-flow-path directly impinging on the flow-path baffle. At 1008, the method includes constraining the flow-path baffle in the sump such that the baffle is above a top sediment height associated with the stormwater sump filled with stormwater and sediment.

Some examples include sizing a plurality of openings in the flow-path baffle to reduce energy from an inlet flow-path to a level associated with a predetermined decrease in upstream upwelling of the sump. Some examples include sizing a plurality of openings in the flow-path baffle to reduce energy from an inlet flow-path to a level associated with a predetermined decrease in washout or scour of the sump. Some methods include studying a sump and determining at least one of: baffle size, including height and width, baffle orientation including baffle angle with respect to one or both of flow-path vectors and vertical position of baffle in the sump, and the size of at least one opening of a baffle. Some methods include studying one or both of a flow-path of a sump and determining at least one of: baffle size, including height and width, baffle orientation including baffle angle with respect to one or both of flow-path vectors and vertical position of baffle in the sump, and the size of at least one opening of a baffle. Some examples include cleaning the sump when sediment rises above the sediment height. Some examples include bolting the flow-path baffle to the sump. Some examples include lowering the flow-path baffle into the sump and adjusting the height of a stand to elevate the flow-path baffle from a bottom of the baffle. Some examples include adjusting includes turning a turnbuckle. Some examples include locking the turnbuckle in place with at least one of a lock nut, a cotter pin and safety wire.

In the present description, reference is made to the accompanying drawings that form a part hereof, and in which is shown by way of illustration specific examples that may be practiced. These embodiments are described in sufficient detail to enable those skilled in the art to practice the invention, and it is to be understood that other embodiments may be utilized and that structural, logical and electrical changes may be made without departing from the scope of the present invention. The present description of example embodiments is, therefore, not to be taken in a limited sense, and the scope of the present invention is defined by the appended claims.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A system for baffling at least one stormwater flow-path, comprising:
a flow-through stormwater sump, the flow-through stormwater sump having a bottom and defining an inlet opening, an outlet opening and a top access opening;
an inlet conduit coupled to the flow-through stormwater sump at the inlet opening;
an outlet conduit coupled to the flow-through stormwater sump at the outlet opening; and
a flow-path baffle disposed in the stormwater sump and raised above a bottom of the stormwater sump, the flow-path baffle being substantially planar and defining at least one opening configured to partially disperse stormwater flowing from the inlet opening between an upstream side of the stormwater sump adjacent the inlet opening and a downstream side of the stormwater sump adjacent the outlet opening to dissipate energy of downward flows of the stormwater, wherein the at least one opening is sized such that between 40% and 50% of a face of the flow-path baffle is open, with, the flow-path baffle oriented such that a centerline of the inlet conduit intersects a major plane of the baffle at a point above a bottom of the baffle, and a centerline of the outlet conduit intersects the major plane at another point that is also above the bottom of the flow-path baffle, the flow-path baffle disposed in the stormwater sump in a direct impingement inlet flow-path of the inlet conduit such that, during the storm flow, the inlet flow-path extends to the flow-path baffle to intersect with the major plane, with a baffle area of the flow-path baffle being larger than a cross-sectional area of the inlet flow-path of the stormwater flow-path, and the flow-path baffle is disposed in the stormwater sump in a direct impingement outlet back-flow-path of the outlet conduit such that, during the storm flow, the outlet back-flow-path extends to the flow-path baffle to intersect with the major plane, with the baffle area being larger than a cross-sectional area of the outlet back-flow-path of the stormwater flow-path.

2. The system of claim 1, wherein the face is approximately 46% open.

3. The system of claim 1, wherein the inlet conduit is substantially tubular proximal the flow-through stormwater sump and the outlet conduit is substantially tubular proximal the flow-through stormwater sump.

4. The system of claim 1, wherein the inlet conduit is substantially horizontal proximal the flow-through stormwater sump; the outlet conduit is substantially horizontal proximal the flow-through stormwater sump; and the major plane of the baffle disposed substantially vertically and a top of the flow-path baffle is vertically above a crown of the inlet opening.

5. The system of claim 1, wherein the flow-path baffle is between approximately 0.055 inches thick and 0.166 inches thick.

6. The system of claim 5, wherein the at least one opening is circular and between approximately 1 and 5 inches in diameter.

7. The system of claim 1, wherein the flow-through stormwater sump is substantially cylindrical.

8. An apparatus for baffling at least one stormwater flow-path, comprising:
a flow-path baffle to be disposed in a stormwater sump having a bottom and defining an inlet opening, an outlet opening and a top access opening, the flow-path baffle being substantially planar and defining at least one opening, the flow-path baffle to be coupled to the stormwater sump raised above a bottom of the stormwater sump, the flow-path baffle to be oriented such that a centerline of an inlet conduit coupled to the stormwater sump intersects a major plane of the flow-path baffle at a point above a bottom of the flow-path baffle, and a centerline of an outlet conduit coupled to the stormwater sump intersects the major plane at another point that is also above the bottom of the flow-path baffle, the flow-path baffle to be disposed in the stormwater sump in a direct impingement inlet flow-path of the inlet conduit such that, during storm flow, the inlet flow-path extends to the flow-path baffle to intersect with the major plane and wherein the at least one opening is configured to partially disperse stormwater flowing from the inlet opening between an upstream side of the stormwater sump adjacent the inlet opening and a downstream side of the stormwater sump adjacent the outlet opening to dissipate energy of downward flows of the stormwater wherein the at least one opening is sized such that between 40% and 50% of a face of the flow-path baffle is open, with a baffle area of the flow-path being larger than a cross-sectional area of the inlet flow-path of the flow-path, and a direct impingement outlet back-flow-path of the outlet conduit such that, during the storm flow, the outlet back-flow-path extends to the baffle to intersect with the major plane, with the flow-path baffle area being larger than a cross-sectional area of the outlet back-flow-path of the flow-path.

9. The apparatus of claim 8, wherein the baffle is to be constrained to the sump via a rod coupled to the flow-path baffle and to be adjusted to interference fit into the sump.

10. The apparatus of claim 8, wherein the sump constrains the flow-path baffle laterally, and a stand constrains the baffle vertically.

11. The apparatus of claim 10, wherein the stand includes a plurality of legs.

12. A method of baffling at least one stormwater flow-path, comprising:
determining an inlet flow-path from an inlet conduit of a stormwater sump and into the stormwater sump;
determining a back-flow-path from an outlet conduit of a stormwater sump and into the stormwater sump;
inserting a flow-path baffle, which includes at least one opening, into the sump with the inlet flow-path and the back-flow-path directly impinging on the flow-path baffle, wherein the at least one opening is configured to partially disperse stormwater flowing from the inlet conduit between an upstream side of the stormwater sump adjacent the inlet conduit and a downstream side of the stormwater sump adjacent the outlet conduit to dissipate energy of downward flows of the stormwater, wherein the at least one opening is sized such that between 40% and 50% of a face of the flow-path baffle is open; and
constraining the flow-path baffle in the sump such that the baffle is raised above a bottom of the stormwater sump, above a top sediment height associated with the stormwater sump filled with stormwater and sediment.

13. The method of claim 12, further comprising sizing the at least one opening to reduce the energy from the inlet flow-path to a level associated with a predetermined decrease in upstream upwelling of the sump.

14. The method of claim 12, further comprising sizing the at least one opening to reduce the energy from the inlet flow-path to a level associated with a predetermined decrease in washout or scour of the sump.

15. The method of claim 12, further comprising cleaning the sump when sediment rises above the sediment height.

16. The method of claim 12, further comprising bolting the flow-path baffle to the sump.

17. The method of claim 12, further comprising lowering the flow-path baffle into the sump and adjusting the height of a stand to elevate the flow-path baffle from a bottom of the sump.

18. The method of claim 17, wherein adjusting includes turning a turnbuckle.

19. The method of claim 18, further comprising locking the turnbuckle in place with at least one of a lock nut, a cotter pin and safety wire.

* * * * *